(12) United States Patent
Worthy

(10) Patent No.: US 8,577,042 B2
(45) Date of Patent: Nov. 5, 2013

(54) LOCATION-BASED SECURITY, PRIVACY, ACCESS CONTROL AND MONITORING SYSTEM

(75) Inventor: David Worthy, Gilbert, AZ (US)

(73) Assignee: RF Code, Inc., Austin, TX (US)

( * ) Notice: Subject to any disclaimer, the term of this patent is extended or adjusted under 35 U.S.C. 154(b) by 1108 days.

(21) Appl. No.: 11/766,482

(22) Filed: Jun. 21, 2007

(65) Prior Publication Data

US 2008/0107274 A1 May 8, 2008

Related U.S. Application Data

(60) Provisional application No. 60/815,676, filed on Jun. 21, 2006.

(51) Int. Cl.
*H04L 9/08* (2006.01)

(52) U.S. Cl.
USPC .......... 380/278; 726/23; 726/2; 726/34; 713/193; 713/194; 713/182; 705/53

(58) Field of Classification Search
USPC .......... 380/278; 705/51–54; 713/156, 171, 713/182, 193; 726/26–27, 2, 34
See application file for complete search history.

(56) References Cited

U.S. PATENT DOCUMENTS

| | | | |
|---|---|---|---|
| 4,450,481 A * | 5/1984 | Dickinson | 380/209 |
| 6,138,240 A | 10/2000 | Tran et al. | |
| 6,147,603 A | 11/2000 | Rand | |
| 6,170,059 B1 | 1/2001 | Pruett et al. | |
| 6,300,874 B1 | 10/2001 | Rand | |
| 6,459,374 B1 | 10/2002 | Rand et al. | |
| 6,480,096 B1 * | 11/2002 | Gutman et al. | 340/5.31 |
| 6,611,201 B1 | 8/2003 | Bishop et al. | |
| 6,624,760 B1 * | 9/2003 | Kinzel et al. | 340/870.11 |
| 6,912,663 B1 | 6/2005 | Dayan et al. | |
| 6,976,634 B2 | 12/2005 | Washington et al. | |
| 7,008,456 B1 | 3/2006 | Tanaka et al. | |
| 7,024,700 B1 | 4/2006 | Horikoshi et al. | |
| 7,174,564 B1 * | 2/2007 | Weatherspoon et al. | 726/2 |
| 7,368,935 B2 * | 5/2008 | Bernier et al. | 326/8 |
| 7,634,088 B2 * | 12/2009 | Sasaoka et al. | 380/44 |
| 7,716,720 B1 * | 5/2010 | Marek et al. | 726/2 |
| 7,734,933 B1 * | 6/2010 | Marek et al. | 713/193 |
| 7,773,754 B2 * | 8/2010 | Buer et al. | 380/277 |

(Continued)

FOREIGN PATENT DOCUMENTS

WO 2007014151 A2 2/2007
WO 2007027000 A1 3/2007

(Continued)

OTHER PUBLICATIONS

Donggang Liu, Location based pair wise key establishments for static sensor networks, NCS University, 2003, pp. 6-9.*

(Continued)

*Primary Examiner* — Nathan Flynn
*Assistant Examiner* — Viral Lakhia
(74) *Attorney, Agent, or Firm* — Larson Newman, LLP

(57) ABSTRACT

A system includes a transmit unit to transmit a signal including a data key, and a receiving unit to receive the signal. The receiving unit to determine an encryption key based at least in part on the data key and to decrypt encrypted data using the encryption key.

30 Claims, 4 Drawing Sheets

(56) References Cited

U.S. PATENT DOCUMENTS

| | | | |
|---|---|---|---|
| 7,802,112 B2 * | 9/2010 | Yasaki et al. | 713/194 |
| 7,987,510 B2 * | 7/2011 | Kocher et al. | 726/27 |
| 2002/0010679 A1 * | 1/2002 | Felsher | 705/51 |
| 2002/0176579 A1 * | 11/2002 | Deshpande et al. | 380/270 |
| 2003/0105971 A1 * | 6/2003 | Angelo et al. | 713/200 |
| 2004/0162076 A1 | 8/2004 | Chowdry et al. | |
| 2004/0193902 A1 * | 9/2004 | Vogler et al. | 713/193 |
| 2005/0055578 A1 * | 3/2005 | Wright et al. | 713/201 |
| 2005/0076242 A1 | 4/2005 | Breuer | |
| 2005/0138110 A1 * | 6/2005 | Redlich et al. | 709/201 |
| 2005/0163319 A1 * | 7/2005 | Hancock et al. | 380/270 |
| 2005/0175181 A1 * | 8/2005 | Bergs et al. | 380/270 |
| 2005/0204405 A1 * | 9/2005 | Wormington et al. | 726/27 |
| 2006/0031934 A1 | 2/2006 | Kriegel | |
| 2006/0059372 A1 * | 3/2006 | Fayar et al. | 713/192 |
| 2006/0236369 A1 * | 10/2006 | Covington et al. | 726/1 |
| 2007/0033419 A1 * | 2/2007 | Kocher et al. | 713/193 |
| 2007/0069852 A1 | 3/2007 | Mo et al. | |
| 2007/0086257 A1 * | 4/2007 | Bernier et al. | 365/218 |
| 2007/0143851 A1 * | 6/2007 | Nicodemus et al. | 726/25 |
| 2008/0036596 A1 * | 2/2008 | Auerbach et al. | 340/542 |
| 2009/0102657 A1 * | 4/2009 | Evans et al. | 340/572.1 |

FOREIGN PATENT DOCUMENTS

| | | |
|---|---|---|
| WO | 2007040613 A2 | 4/2007 |
| WO | 2007045051 A1 | 4/2007 |
| WO | 2007050442 A1 | 5/2007 |
| WO | 2007057786 A2 | 5/2007 |
| WO | 2007060426 A1 | 5/2007 |
| WO | 2007060494 A1 | 5/2007 |

OTHER PUBLICATIONS

S Lijepcevic, Communication security in wireless ad-hoc sensor networks, Mar. 2002, vol. 11, pp. 1-11.*

Akyildiz, Ian R. et al., "A survey on sensor networks" (online), In Communications Magazine, IEEE Publication Date: Aug. 2002, vol. 40, Issue 8, pp. 102-114.

* cited by examiner

LOCATION-BASED SECURITY, PRIVACY, ACCESS CONTROL AND MONITORING SYSTEM

CROSS-REFERENCE TO RELATED APPLICATION(S)

The present application claims priority from U.S. Provisional Patent Application No. 60/815,676, filed, Jun. 21, 2006, entitled "LOCATION-BASED SECURITY, PRIVACY, ACCESS CONTROL AND MONITORING SYSTEM," naming inventor David Worthy, which application is incorporated by reference herein in its entirety.

FIELD OF THE DISCLOSURE

This disclosure, in general, relates to location-based access control and monitoring systems.

BACKGROUND

An increasing problem is that of maintaining privacy of equipment, data and personnel. Laws, such as that required by the California Information Act that affects institutions across the country having offices or that do business in California, and Federal Privacy Laws, are adding a much higher level of responsibly and significant financial risk.

Critical organizations have sensitive personnel files and data that include credit card companies, banks, mortgage companies, accounting firms, law firms, hospitals, governments, homeland defense, military, and many others. While a lot of attention has been given to external threats, often, a greater risk is employee theft or even unintentional disclosure.

Recently, the personal files of 26.5 million veterans were improperly taken home by a VA employee, and the files, including social security numbers and other very sensitive veteran's personnel records, were subsequently stolen in a break-in of his house. Before that, the military in Iraq had numbers of critical flash drives, computers and storage mediums stolen by local employees and then sold in flea markets. Banks, credit card and data storage companies have recently had large thefts of personal credit, account records and other data that later was used for identity and credit card theft.

Whether intentional or not, failure to follow privacy laws may be extremity expensive. State laws and liability associated with exposure of private data may lead to fines and costly litigation. As such, an improved method of protecting data would be desirable.

SUMMARY

In a particular embodiment, a system includes a transmit unit to transmit a signal including a data key, and a receiving unit to receive the signal. The receiving unit determines an encryption key based at least in part on the data key and decrypts encrypted data using the encryption key.

In another exemplary embodiment, a method of securing data includes receiving a signal from a fixed location transmitter. The signal includes a data key. The method further includes determining an encryption key based at least in part on the data key, and decrypting encrypted data using the encryption key.

In a further exemplary embodiment, an apparatus includes a receiver to receive a signal from a fixed location transmitter. The signal includes a data key. The apparatus further includes a computational circuitry coupled to the receiver. The computational circuitry permits access to data based at least in part on the data key.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENTS

In a particular embodiment, a method of protecting data on a device includes determining whether the device is located in a desired location and preventing access to the device based on the location of the device. For example, a fixed location transmitter may transmit a signal indicative of the location. A portable tag may be configured to receive the signal and determine whether a device attached to the portable tag is in a desired location. If the device is in a desired location, the portable tag may permit access to the device. Alternatively, when the device is not in a desired location, the portable tag may prevent access to the device.

In an exemplary embodiment, a fixed location device includes a transmitter and is coupled to a fixed power source, such as a wall plug or line power. The fixed location device also may include a receiver for two-way communication with a portable tag or for communication with a central monitoring system. In addition, the fixed location device may include a sensor to detect tampering or movement of the fixed location device. Further, a portable tag may include a receiver to receive a location signal from the fixed location device. The portable tag also may include circuitry to determine whether the portable tag is in a desired location based on the signal. The portable tag may include memory and may be coupled with a device, such as a computing device.

Figure 1:
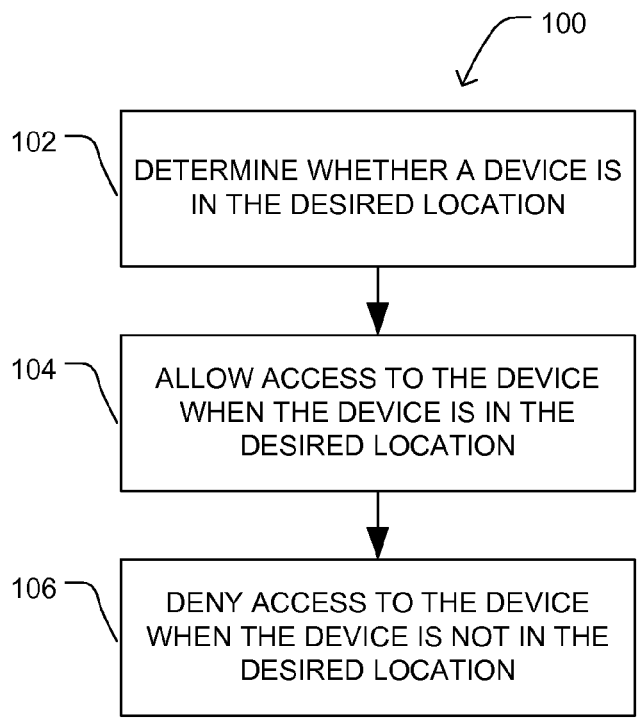
FIG. 1 includes a flow diagram illustration of an exemplary method for securing a device.

As illustrated in the exemplary method 100 of FIG. 1, the portable tag may determine whether the portable tag or a device coupled to the portable tag is in a desired location, as illustrated at 102. The location may be a single large area, be located within the range of cryptographic transmitter, transponder, or transceiver devices, include multiple areas or a matrix of zones or small areas, or may be points determined by using signal presence detection, ranging, triangulation, GPS or any combination thereof.

Once the portable tag determines whether it or a device attached to it are in a desired location, the tag may permit access to the device, as illustrated at 104, or in a particular example, may permit access through the device interfaces to data stored on the portable tag or the device. For example, data stored on the portable tag or the device may be locked and the portable tag may unlock access to the data when the device or portable tag are located in a desired location. In a particular example, access to the data may include permission to perform one or more of printing, copying, transmitting, viewing, decryption, or any combination thereof.

Conversely, when the portable tag determines that the portable tag or the device attached to the portable tag are not in a desired location, the portable tag may prevent access to the device, as illustrated at 106. For example, the portable tag may prevent access to locked data stored on the portable tag or on the device. In particular, denying access to the data may include preventing one or more of printing, copying, transmitting, viewing, decrypting, or any combination thereof.

In a particular example, the data may be encrypted. The portable tag may prevent access to a key for decrypting the data when the portable tag is not in a desired location. Further, the portable tag may destroy the data under particular circumstances, such as when outside a desired location, when in an undesirable location, or when a fixed location device indicates that tampering has occurred.

Figure 2:
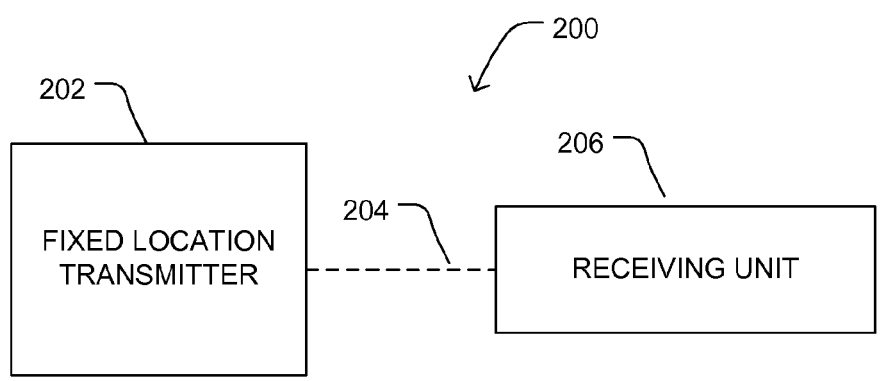
FIG. 2 includes an illustration of an exemplary security system.

In an exemplary embodiment, FIG. 2 includes an illustration of a simple system 200 for providing access to devices. The system 200 may include a fixed location transmitter 202 and a receiving unit 206. For example, the fixed location transmitter 202 may be configured to identify a fixed area, such as a confined area. In particular, the confined area may be a building or a room. The fixed location transmitter also may be used to identify an area, such as a patio, square, or defined space.

The fixed location transmitter 202 may provide a signal, such as a wireless signal 204. The fixed location transmitter 202 and the receiving unit 206 may interface or communicate using the Internet, WI-FI (Wireless Fidelity), Ethernet, Bluetooth, 802.11, carrier current, Wireless G, spread spectrum, cellular telephone networks, telephone lines, cables, wires, infrared, acoustics, radio or other methods, or any combination thereof, and may operate locally, globally, or both. For example, the wireless signal 204 may be a radio frequency signal, an infrared signal, or an acoustic signal. In particular, an infrared signal may be used to provide a location signal within a confined area and not outside of that area.

A receiving unit 206 may be configured to receive the signal 204 and determine whether the receiving unit 206 is in a desired location. For example, in the absence of a signal, the receiving unit 206 may determine that it is not in a desired location. In the presence of the signal, the receiving unit 206 may determine, at least in part based on the signal, that the receiving unit 206 is in a desired location.

The receiving unit 206 further may include other interfaces, such as interfaces that allow password input, fingerprint reading, or identification tag reading. In addition, the receiving unit 206 may include an interface to a device, such as a computer. For example, the interface to the device may be a USB interface, a Firewire interface, a PCMCIA card interface, a serial interface, a parallel interface, or another communication interface, or any combination thereof.

Such interfaces may provide addition input that may be used as an additional limitation on access to the device. For example, a password, fingerprint, tag identification, receiving unit identification, time-of-day, or device identification may provide a second condition to be used in conjunction with the signal in determining whether access to the device is to be permitted or restricted.

In a particular example, the fixed location transmitter 202 may include a data key that forms at least part of an encryption key and the receiving unit 206 may receive the data key and formulate the encryption key based at least in part on the data key. As such, the fixed location transmitter 202 may be referred to as a cryptographic transmitting unit and the receiving unit 206 may be referred to as a cryptographic receiving unit. In such an example, an automatic or stealth "key" that is location specific, and cannot be moved is provided, and the use of the "key" is not dependent on the direct action of persons to achieve a higher level of security. As such, if an employee accidentally, indivertibly, or on purpose takes or exposes files or equipment, the private or confidential information may be inaccessible. In a particular example, if the fixed location transmitter 202 is moved, it senses tampering and destroys its internal encryption programming and codes.

In a further embodiment, the receiving unit 206 is in the form of a portable memory device, such as a USB memory unit or "stick" that contains stored encryption keys and locking capability, that may hide or encrypted files in a computer, or that may destroy the files in critical situations. The receiving unit 206 is portable and access through the receiving unit 206 is location dependent. Further, data may be locked or destroyed when the receiving unit 206 or the fixed location transmitter 202 are mishandled or accessed in an unauthorized fashion.

In particular examples, the system 200 allows authorized equipment or file access or removal to occur only in specific locations, facilities, stations, smart containers, vehicles, rooms or area, and access may be only allowed during defined conditions, such as by authorized personnel having specific clearance or authorization levels, during office hours, when other extended security methods, such as access control, are functioning. In particular, the files or data to which access is controlled are stored on equipment coupled to the receiving unit 206 or on the receiving unit 206 itself, in contrast to files or data that form part of the communication between the transmit unit 202 and the receiving unit 206.

Therefore, privacy or confidential data or information may be only available in designated locations such as at work, in a specific office or area, and using only designated equipment. In other places or when used with other equipment, the data may not be accessible, even with personnel having proper access codes, the correct identity, or other authorized access methods. In another example, access may be permitted only in the right place and at specific times, such during office hours, or under other defined conditions. In some cases, data may only be entered at one location and output at another, such as entered at a local office or data entry center, and accessed only at the headquarters office or storage facility.

Further, the receiving unit 206 may include a transponder and the fixed location transmitter 202 may include a transponder to perform two-way communication with the receiving unit 206. In an example, additional data may be provided by the receiving unit 206 to the fixed location transmitter 202. For example, the receiving unit 206 may provide an identification number to the fixed location transmitter 202. In an example, the receiving unit 206 may include sensors indicative of tampering. In another example, the receiving unit may transmit the identification of the device to which it is attached, information about data stored on the receiving unit, or confirm receipt of the signal provide by the fixed location transmitter 202.

The two-way communication between the receiving unit 206 and the fixed location transmitter 202 may occur on the same wireless connection as the location signal. Alternatively, the two-way communication may occur on a different wireless connection. For example, the location signal may be transmitted on an infrared signal and the two-way communication may be transmitted using radio frequencies.

Similar methods may be used in large "smart containers" that carry goods around the world, as well as smaller "smart" containers that carry cash, records, files, jewelry and other valuable or critical records. The devices may be "smart", in the sense that the devices may only be opened in certain locations. In essence, the devices have an electronic "lock" that operates only on "key" signals received in specific locations, from certain "keys", and under defined condition. A "smart" container, or other similar item or object also may have the functions of a RFID tag, as well as a "lock", such as transmitting its identification, location, status, sensor inputs, security status, instructions, commands, other data and information, or any combination thereof. In particular, a location-based security system may provide access and control of computer equipment and data only in authorized and designated locations, or under other defined conditions.

In an exemplary embodiment, an open-loop or one way system is equipped with a cryptographic transmit unit in a fixed location that communicates an encryption key, obfuscating, masking, or other codes, identification, location, power, proximity, tamper, motion, movement, alert, alarm or other status, controls, instructions or commands to one or more cryptographic receiving units. The cryptographic receiving unit deciphers, using communication, encryption and operational protocols, and operates to provide access control and security in accordance with the keys or codes, in conjunction with local computers, terminals, smart containers or other units or systems. Access to the computer or associated secure files and data only occurs when the cryptographic receiving unit is in proximity in a defined location, such as in a specific room or area, and is continuously enabled by a designated cryptographic transmit unit, using encryption codes and keys. In a particular example, the encryption codes and keys may have portions that continuously change over time, to prevent their replication.

In an example, when not in the defined location, access or removal of files by flash memory, hard disk, CD, modem or other transport or communication methods may be inhibited, or the files or data may be destroyed. For example, such access controls may be implemented even when the cryptographic transmitting and receiving units are physically removed to another location.

In addition, the system may define who has proper access and under what conditions, such as during working hours only, access to some files and not others, authorization level, required personnel access codes or identification, confirming physical access or other security is operating, or it may define other specific conditions.

In a particular example, if the cryptographic transmit unit is disturbed or removed the system and certain files shut down to prevent access to the computer or files, or may cause sensitive files in certain defined mediums to self-destruct. If the computer or files are not destroyed but are removed they cannot be accessed or read without access to the cryptographic transmit unit, which if it also has been moved or tampered with, may destroy the encryption keys and codes and may not operate, unless reinstituted by authorized personnel having required encryption programming equipment and capability.

In an exemplary expanded closed-loop or two-way embodiment or system, a cryptographic transponder unit sends and receives encryption codes, keys, status and other information in communication with a cryptographic transceiver unit. In such an example, when the computer or other defined components are removed, tampered with or an attempt to access the unit is made by an unauthorized person, during the wrong time or other inappropriate conditions, the cryptographic transponder unit may raise an alarm, or if equipped with additional system communication capability, may send a signal to a remote system indicting an abnormal status condition, loss of power, tamper, motion, movement, or security alert. Failure of the system to receive, on a periodic basis, a normal status report may cause an alarm condition.

In another exemplary expanded closed-loop embodiment or system, a cryptographic transmit unit communicates with a cryptographic transceiver unit additionally equipped with a wireless system communication capability that may send a signal to a remote control and monitoring system directly, indicting a normal status report, as well as a tamper, movement, unauthorized condition, such as operating out of defined hours, unauthorized access attempt, controlled access breach, loss of cryptographic transmit unit signals or other alarm condition.

When used to provide access to encrypted data, the system 200 may used various cryptography techniques. In particular, a key may be sent by a secure channel to a location where the key is used to decipher or extract encrypted data or information, open a lock, enable access, or other tasks. In public encipher and decipher, two keys may be used, where one is public and the other key is also used.

In an embodiment, a private or non-disclosed Key 1 is sent by a cryptographic transmit unit over a secure or unsecured communication link to a cryptographic receiving unit that has an internal Key 2, which together may encipher or decipher data or information, open or close a lock, or provide security, access control, or other functions. In another embodiment, a public or disclosed Key 1 is sent by a transmit unit over a secure or unsecured communication link to a receiving unit that has an internal private or undisclosed Key 2, which together, may provide encipher or decipher functions. In a further embodiment, a private or undisclosed Key 1 may be sent by a transmit unit over a secure communication link to a receiving unit that has an internal public or private Key 2, which together, may provide encipher or decipher functions.

In another embodiment, a private or undisclosed key may be sent by a transmit unit over a secure communication link to a receiving unit that does not have key. The private or undisclosed key may be used to encrypt or decrypt data.

The system may use one or more of the above embodiments or a combination thereof, to provide security by location, or by a key or other codes and data transmitted. In addition, the cryptographic transmit unit may be implemented in a network access point and the cryptographic receiving unit may be implemented in a network interface. Further, the system 200 may be designed to work with a wide range of public and private encryption systems, rolling codes, passwords, locking and other security systems.

Figure 3:
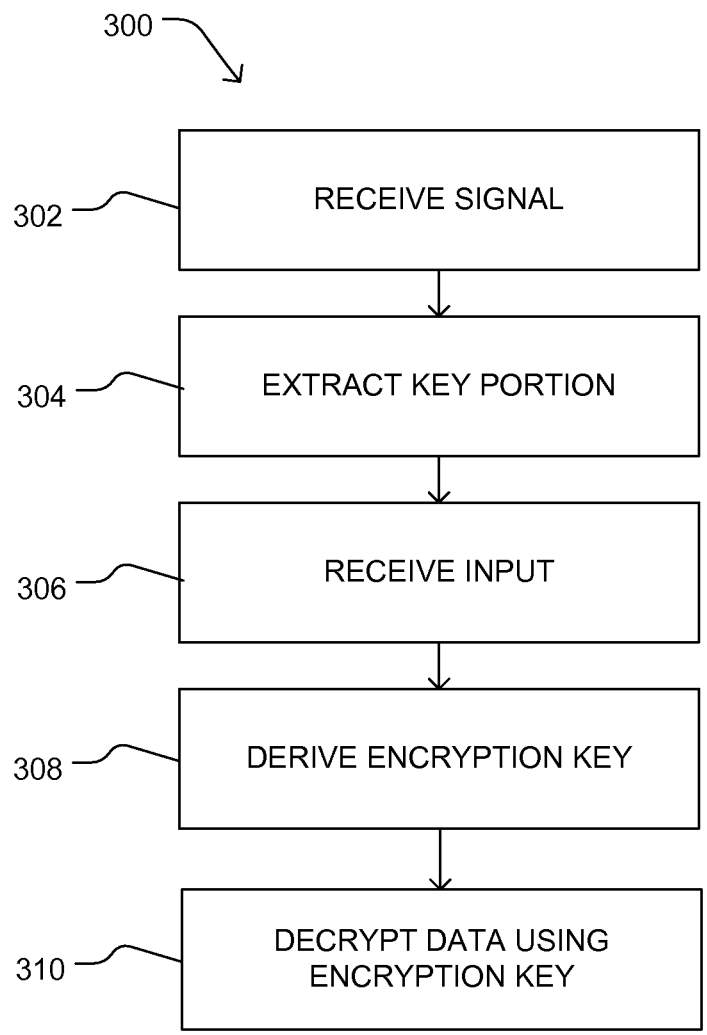
FIG. 3 includes a flow diagram illustration of an exemplary method for securing data.

In a particular embodiment, FIG. 3 illustrates a method 300 to provide access to data. The method 300 includes receiving a signal, as illustrated at 302. For example, the signal may be provided by a cryptographic transmit unit. In an example, the signal includes a data key. In particular, the data key may form at least a portion of an encryption key or may be used at least in part to determine an encryption key. A cryptographic receiving unit may extract the data key from the signal, as illustrated at 304.

Optionally, the cryptographic receiving unit also may receive an input, as illustrated at 306. The input may be a password entered through a key pad or in response to a fingerprint. In another example, the input may be an identifier, for example, from an ID card. In a further example, the input may be a device identifier received from a device connected to the cryptographic receiving unit.

The cryptographic receiving unit may derive an encryption key from the data key and optional input, as illustrated at 308.

For example, the data key may form at least a portion of the encryption key or may be converted to an encryption key in combination with a private key or the optional input. In a further example, encryption methods that change with time, such as rolling key methods, may be used. As such, the data key may be used in such a method to determine the encryption key.

Using the encryption key, encrypted data may be decrypted, as illustrated at 310. For example, the cryptographic receiving unit may store encrypted data. When the data is requested, the cryptographic receiving unit may derive the encryption key and decrypt the data when the derived encryption key is correct.

In another example, the device, such as a computational device, attached to the cryptographic receiving unit may store encrypted data. When an attempt is made to access the encrypted data, the device may request an encryption key from the cryptographic receiving unit. The cryptographic receiving unit may derived the encryption key and provide the encryption key to the device when the cryptographic receiving unit is in the desired location and thus, receives a correct data key.

Figure 4:
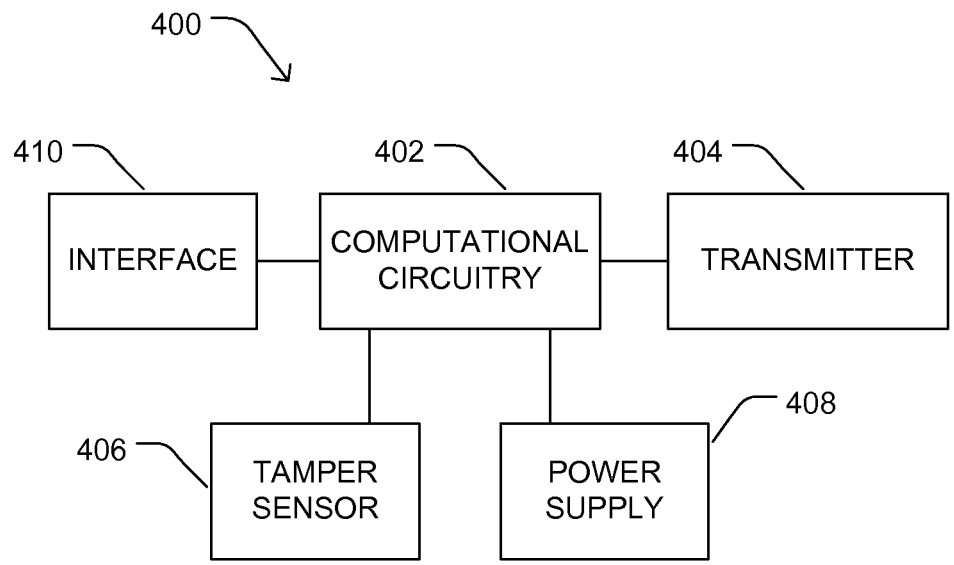
FIG. 4 includes an illustration of an exemplary transmitter unit.

In an exemplary embodiment, FIG. 4 includes an illustration of an exemplary fixed location transmitter 400. The fixed location transmitter 400 may include a computational circuitry 402, such as a microprocessor and memory. The computational circuitry 402 may be coupled to a transmitter 404, such as an infrared (IR) transmitter. As such, the computational circuitry 402 may direct the transmitter 404 to provide a signal over an area.

Further, the fixed location transmitter 400 may include a tamper sensor 406. The tamper sensor 406 may detect motion, movement, proximity, IR reflection, loss of power, or any combination thereof. Based on logic, the tamper sensor 406 may be used to determine a tamper status that may be incorporated in the signal or be reported to a control and monitoring system.

In addition, the fixed location transmitter 400 may include a power supply 408. The power supply 408 may be an auxiliary power supply when the fixed location transmitter 400 is coupled to line power, such as a wall plug.

Further, the fixed location transmitter 400 may include an additional transponder 410, such as for two-way communication or for communication to a central monitoring system. In another example, the transmitter 404 is part of a transponder 410. In particular, an additional interface may provide data access through a local area network, wired or wireless, or through connection to a power line or telephone line. For example, the transmitter 404 may be an IR transmitter and the transponder 410 may be a radio frequency wireless access transponder.

Figure 5:
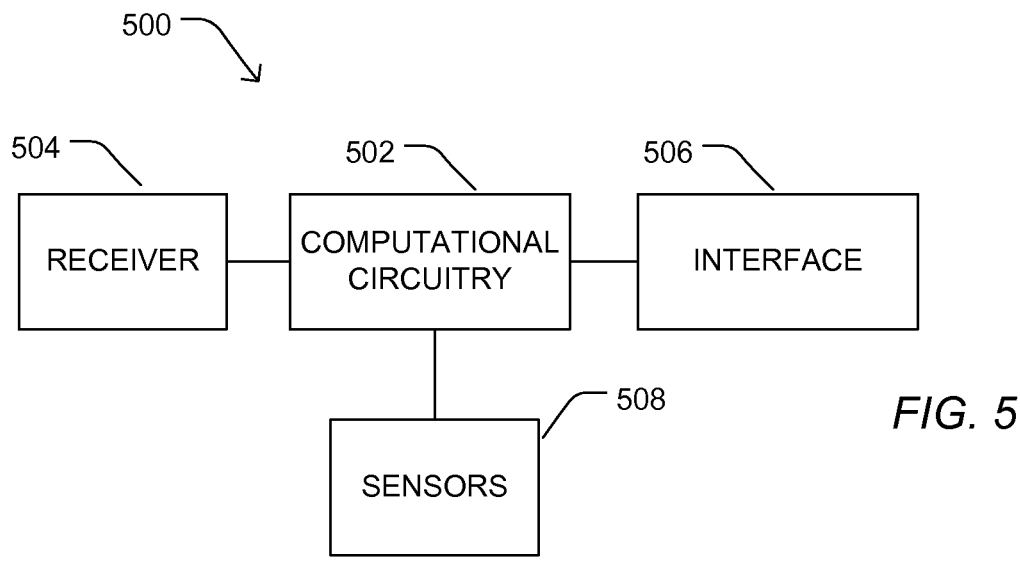
FIG. 5 includes an illustration of an exemplary receiver unit.

FIG. 5 includes an illustration of an exemplary receiving unit 500. For example, a computational circuitry 502, such as a microprocessor and memory, may be connected to a receiver 504, such as an IR receiver. Alternatively, the receiver may be a transponder. In a particular example, the receiving unit may include both an IR receiver and an RF transponder. The computational circuitry 502 also may be connected to a device interface 506, such as a universal serial bus (USB) interface or a PCMCIA.

The memory of the computational circuitry 502 may store data to which access is controlled. For example, the memory may store encrypted data. Alternatively, data, such as encrypted data, may be stored on a device accessible through the device interface 506.

The computational circuitry 502 may be configured to acquire a data key via the receiver 504 and determine whether the receiving unit 500 is in a desired location. In an example, the computational circuitry 502 may derived an encryption key at least in part based on a signal from a fixed location transmitter.

In addition, the receiving unit 500 may include sensors 508 coupled to the computational circuitry 502. Such sensors 508 may be configured to detect motion, movement, environmental conditions, an identification card, a fingerprint, or any combination thereof. Further, the receiving unit 500 may include a key pad connected to the computational circuitry 502.

Figure 6:
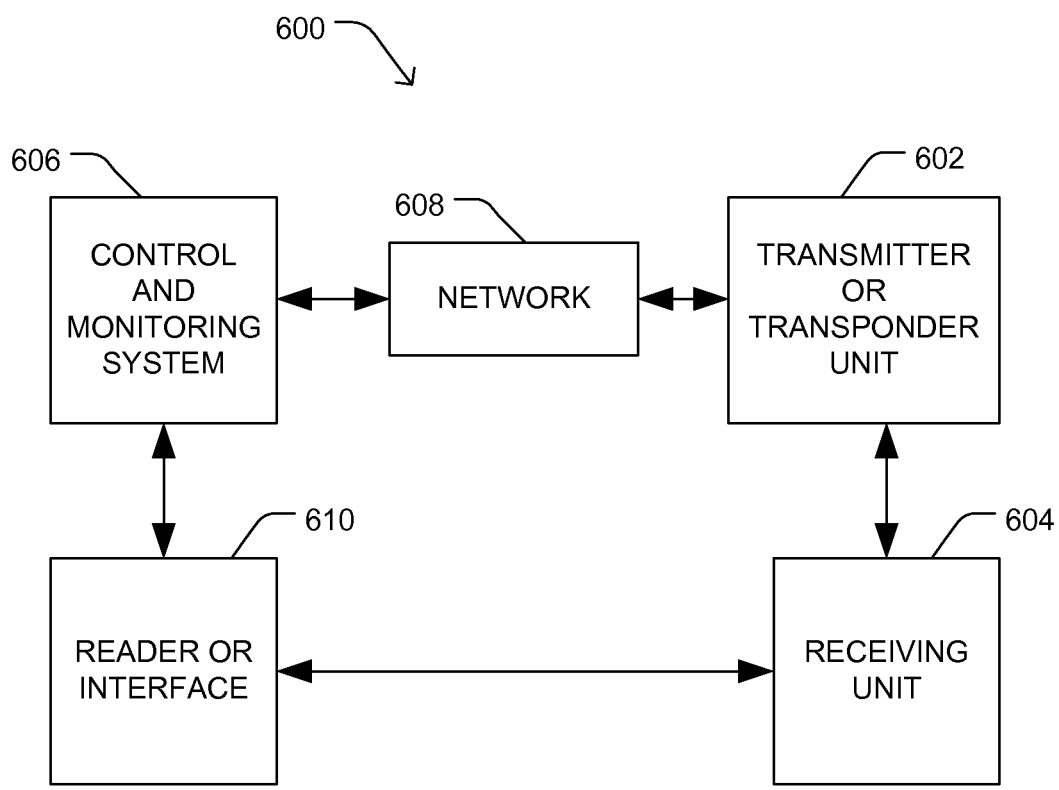
FIG. 6 includes an illustration of an exemplary security and monitoring system.

In another exemplary embodiment, the system may include a central monitoring system. For example, FIG. 6 includes an illustration of an exemplary system 600. A transmitter unit 602 and a receiving unit 604 may be configured to communicate as described above. In addition, the transmitter unit 602 may be configured to communicate with a control and monitoring system 606, such as via a separate network 608. In an example, the network 608 may be a wired or wireless network, and in particular, may be a radio frequency wireless network, such as a network using a standard wireless protocol specified in IEEE 802.11, IEEE 802.15, or IEEE 802.16.

Further, the receiving unit 604 may communicate with the control and monitoring system 606, either via the transmitter unit 602 or separately via a reader or interface 610. In a particular embodiment, the interface 610 may be a network and the network 608 and the interface 610 may be the same. Alternatively, the reader or interface 610 and the network 608 may use different protocols. For example, each communication link in the system may be a one-way or two-way, using wireless, carrier current, IR, optics, telephone lines, cable, wires, Internet or other methods, perhaps in operation with a secure website.

In an example, the transmit unit 602 communicates with the receiving unit 604. The transmit unit 602 may log interaction with the receiving unit 604 at the control and monitoring system 606. In another example, the control and monitoring system 606 may store a data key that is provided to the transmit unit 602. In particular, the data key may not be stored by the transmit unit 602, and as such, when the transmit unit 602 is tamper with, the data key would not be accessible.

In a further example, the control and monitoring system 606 may monitor sensors on the transmit unit 602. Such sensors may be used to determine whether the transmit unit 602 is disturbed. In such an example, the control and monitoring system 606 may change the status of the transmit unit 602 to an invalid or untrusted status. The revised status may be provided to the transmit unit 602 for transmission to the receiving unit 604. Alternatively, the control and monitoring system 606 may provide the status to the receiving unit 604 directly.

In another example the control and monitoring system 606 may track the location of the receiving unit 604 and any devices to which the receiving unit 604 is attached. For example, the control and monitoring system 606 may track a receiving unit's 604 location within a building, either through communication with a transmit unit 602 in proximity to the receiving unit 604 or through direct communication with the receiving unit 604 in which the receiving unit 604 indicates which transmit unit or units 604 it detects.

In an alternative embodiment, the functionality of the transmit unit 602 and the receiving unit 604 may be emulated using software in a wireless network access point and in a device in communication with the wireless network access point. Further, a control and monitoring system may communicate with the wireless network access point through the wireless network or through a wired network coupled to the wireless access point.

An exemplary message of a cryptographic transmit or transponder unit, or a network access point is as follows. Generally, the system may use one or more of these potential message elements, and the message may include additional start, stop and other wired or wireless communication related functions. For example:

| Word | Functions | Send Unit (Key) Message Description |
|---|---|---|
| 1 | Type | Defines type of message, message number, message format, word format, word lengths, word function, number of words, encoding etc. |
| 2 | Identification | Identification or ID of the sending or originating cryptographic or access point unit. |
| 3 | Location | The location of the sending unit such as room number, geographic location, facility name, others. |
| 4 | Address | The address or identification of the intended Cryptographic Receiver Unit, or an address that selects a group of units. |
| 5 | Password | A code to access the intended Receiving unit or group of units. |
| 6 | Key | An encryption key or un-encryption key to lock or unlock the receiving unit, its associated hardware, files and data. A key may be a private or a public key depending on the application. |
| 7 | Security Status | The status of the sending unit such as tamper, motion, proximity or other security related functions and if appropriate based on its programming: Send an alert or alarm condition to the Receiving unit, Send an alert or alarm condition to the control system (if it has a connection) Set off audible alarms, visible alarms or other warnings. Cause the sending unit to lock or shut down or destroy its internal keys, passwords or other critical information. |
| 8 | General Status | The status of the sending unit AC power, DC power, battery voltage or other measure. In a unit equipped with a battery backup or large capacitor supply the unit may continue to operate if removed or tampered with for a short period, while outputting alarm conditions and doing a security shut down. |
| 9 | Time and Date | A time and date stamp, an accumulated time or period, or time from the last transmission. |
| 10 | Controls | Commands, instructions, or controls sent from the cryptographic transmit/transponder unit or from a monitoring system that has communication capability with the Send Unit or the Receiving unit. |
| 11 | Others | Other functions may be added - such as network chip, script and interface functions. |

The sending unit (Key) may be programmed to send periodic message, messages split into multiple transmission, or the messages may occur in an encoded time pattern. In addition, the occurrence of a security function, such as activating of the tamper detector, motion detector, proximity detector, or other methods, may indicate an attempt to remove the unit, and may cause the unit to immediate send a message without waiting for the next periodic signal period.

In addition, the sending unit may be remotely instructed to send periodic, special messages or alert and alarm messages, for example, by a control and monitoring system. Conversely, a receiving unit with a transmit capability may request a message.

In an exemplary embodiment, the associated receiving unit, under program control, generally responds to each of the above messages and message elements, such as by using one or more of the following message elements, for example:

| Word | Functions | Receiving unit (Lock) Description |
|---|---|---|
| 1 | Type | Based on the type of message, message number, message format, word format, word length, word function, number of words, etc., unit responds or not based on its type, and may change the message and word read decoding format to match what is being sent, whether it be a short or long message, or have different word lengths and functions. |
| 2 | Identification | Accept the message if it corresponds to a number or series of ID numbers programmed in its memory, or it is programmed to accept a group of ID or all ID numbers. |
| 3 | Location | Accepts the message if the location of the sending unit such as room number, geographic location, facility name, or others matches what it has in memory, or it is programmed to accept a group of locations or all locations. |

-continued

| Word | Functions | Receiving unit (Lock) Description |
|---|---|---|
| 4 | Address | The address or identification of the intended unit, or an address that selects a group of units that matches what it has in memory. |
| 5 | Password | A code to access the intended receiving unit or group of units, if it matches a password in memory. |
| 6 | Key | An encryption key or un-encryption key to lock or unlock equipment, files, memory, locks or other items. |
| 7 | Security Status | The status of the sending unit such as tamper, motion, proximity or other security related items, if activated shut down the units operation, or it is programmed to shut down equipment, access to files, lock files or destroy files. May send an avert alert or alarm message based on its internal or control unit evaluation of the status information, and may send a short repetitive alarm message. |
| 8 | Alert or Alarm | The sending of an alert or alarm condition results in the Transmit and Receiving unit initiating security measures to protect critical data such as the keys, and the Receiving unit associated equipment and data. |
| 9 | General Status | The status of the sending unit AC power, DC power, battery voltage or other matrix. |
| 10 | Time and Date | A time and date stamp, an accumulated time or period, or time from the last transmission. |
| 11 | Controls | Commands, instructions, or control sent from the transmit/transponder unit or from a monitoring system that has communication capability with the Transmit Unit or with the Receiving unit. |
| 12 | Other | Other functions may be added. |

The key, password, or other codes may be rolling in that they change with each transmission or message. The receiving unit may be programmed to accept each appropriate rolling code. In addition, the receive may correlate the time stamp and ensure that rolling key, password and other codes are in synchronization or correlate with the time from the last received massage. For example, if the receive message are inhibited or blocked for 10 minutes, then the rolling codes may be adapted to match those that would normally programmed to occur 10 minutes after a specific transmission.

The receiving unit may be program to accept specific message formations, sending unit ID codes, password, key and other codes, as well as instructions, algorithms and other methods to encipher or decipher critical data or information, or perform other tasks.

A transponder may operate to reply to a transmission. In this manner, the system may confirm reception, and the security and status of the receiving unit, but it may also have a communication handshake and interchange of codes for greater security.

For example, a reply or reverse channel may be used to control the rolling code transmission, or serve as a component of the transmit key, password or other codes. In an example, the reply channel may transmit an updated receive password to the transmit unit to access the receiving unit.

In a further exemplary embodiment, the transmit unit may communicate with a control or monitoring system using functions and messages that include one or more message elements, such as, for example:

| Send/Receive | Functions | Transmit Unit With Expanded System Communication Interface |
|---|---|---|
| Send | Transmit Unit sends to local or remote Control Systems (Over cable, wireless networks, carrier current, Internet, others or combination) | Cryptographic Transmit or Transmit Transponder Unit may send internally generated output or relay outputs received from Cryptographic Receive Transponder Units including:<br>Message Reply Confirmation (from Control System or from Receiving unit)<br>Security Alert Or Alarms (Internal or from Receiving unit)<br>Out Of Location (No Receiving unit Reception)<br>Security Status Such As Tamper, Motion, Proximity Etc. (internal or from Receiving unit)<br>Setup or Programming Status (internal or from Receiving unit)<br>Associated Computer or System Status (Connected to Receiving unit)<br>Data Transfer (Authorized, Internal or from Receiving unit)<br>Message Transmission Requests (Directed to System)<br>Re-transmission of other Receiving unit Inputs (In the same form or modified)<br>Transmission as if a Tag (as if Send Unit or Receiving unit is a tag)<br>Others |

-continued

| Send/Receive | Functions | Transmit Unit With Expanded System Communication Interface |
|---|---|---|
| Receive | Transmit Unit receives from local or remote Control System (Over cable, wireless networks, carrier current, Internet, others or combination) | Control System may send to Cryptographic Transmit or Transmit Transponder Unit may send internally generated output or relay outputs received from Cryptographic Receive Transponder Units, sensors, or other sources including:<br>Controls and instructions (from Control Unit to Transmit Unit or for relay to Receiving unit)<br>System setup including sending keys and other codes (To Transmit Unit or for relay to Receiving unit - requires authorized security personnel and setup equipment)<br>Message Reply Confirmation (from Control System or as received from Receiving units)<br>Security Alert Or Alarms (Internal or received from Receiving unit(s))<br>Out Of Location (No Receiving unit reception as received from Receiving unit(s))<br>Security Status Such As Tamper, Motion, Proximity Etc. (Receiving units, system sensors, access control, badges etc.)<br>Setup or Programming Status (for Transmit Unit or for relay to Receiving unit)<br>Associated Computer or System Status (Connected to Receiving unit)<br>Data Transfer (Internal or from Receiving unit - meeting required authorization)<br>Message Transmission Requests (Directed to System)<br>Re-transmission of other Receiving unit Inputs (In the same form or modified)<br>Transmission as if a Tag (as if Send Unit or Receiving unit is a tag)<br>Others |

In a further embodiment, the receiving unit may be configured to communicate with the control or monitoring system separately and may use functions and messages including one or more elements, such as, for example:

| Send | Functions | Receiving unit With Expanded Communication Capability |
|---|---|---|
| Send | Receiving unit sends to local or remote Control System (Over RF, cable, wireless networks, carrier current, Internet, others or combination) | Cryptographic Receive or Received Transponder Unit with expanded independent communication capability to Control System may send internally generated output or relay outputs received from Cryptographic Transmit or Transmit Transponder Units including:<br>Message Reply Confirmation (from Transmit or relayed from Control System)<br>Security Alert Or Alarms (Internal or from Transmit Unit or relayed from Control System)<br>Out Of Location (No Transmit Unit Reception)<br>Security Status Such As Tamper, Motion, Proximity Etc. (internal or from Transmit Unit)<br>Setup or Programming Status (internal or from Transmit Unit)<br>Associated Computer or System Status (Connected to Receiving unit)<br>Data Transfer (Authorized, Internal or from Transmit Unit or relayed from Control System)<br>Message Transmission Requests (Directed to System)<br>Re-transmission of other Transmit Unit Inputs (In the same form or modified)<br>Transmission as if a Tag (as if Send Unit or Receiving unit is a tag)<br>Others |
| Receive | Receiving unit receives from local or remote Control System (Over Transmit Unit or cable, wireless networks, carrier current, | Receiving unit may receive inputs from Transmit Unit or relayed from Control System, or if equipped received directly, the following functions<br>Controls and instructions (from Transmit Unit or from Control Unit relayed by Transmit Unit, or received directly from Control System)<br>System setup including sending keys and other codes (From Transmit Unit or relayed from Control System, or received directly - requires authorized security |

| Send | Functions | Receiving unit With Expanded Communication Capability |
|---|---|---|
| | Internet, others or combination) | personnel and setup equipment) Message Reply Confirmation (from Transmit Unit or received directly) Security Alert Or Alarms (Internal or received from Transmit Unit(s)) Out Of Location (No Transmit Unit reception) Security Status Such As Tamper, Motion, Proximity Etc. (Transmit or Receiving units, system sensors, access control, badges etc.) Setup or Programming Status (From Transmit Unit or for relayed from Control Unit) Associated Computer or System Status (Connected to Receiving unit) Data Transfer (Internal or from Transmit Unit - meeting required authorization) Message Transmission Requests (Directed to System) Re-transmission of other Transmit Unit Inputs (In the same form or modified) Transmission as if a Tag (as if Send Unit or Receiving unit is a tag) Others |

In an exemplary embodiment, the communications systems may employ a high-intensity pulse or OOK modulation infrared (IR) transmission. In particular, the IR transmissions from a cryptographic transmit unit may bounce and penetrate in and around objects to reach the cryptographic receiving unit, and still be contained within a room or area. The use of pulses for transmission may permit high intensity outputs using a modest average power to reduce heat dissipation in the IR transmit diode and reduce overall power. Alternatively, mediums, such as radio, magnetic induction, visible light, acoustics, or other wired or wireless methods, may be used. In addition, other modulations methods, such as AM, FM, FSK, PSK, or frequency hopping, may be used.

In the following example, a dibit may be used for binary or logic transmission that is made up of two sequential pulse periods with the following relationships.

A Logic ONE (1) transmission=A Pulse ON followed by a Pulse OFF (10).

A Logic ZERO (0) transmission=A Pulse OFF followed by a Pulse ON (01).

Therefore, at the receiving unit, each dibit may be read as the result of two conditions over two periods, and may be differentially read as the first pulse minus the second resulting in the following:

Logic ONE(1)=1−0=1

Logic ZERO(0)=0−1=−1

Therefore, the dynamic range of the data is doubled compared to a single bit since it is made from two logic conditions, and the differential or subtraction reading of the data helps cancel common mode noise and interference. In addition, the duty cycle of the pulse transmission may be reduced and each dibit has a zero DC term effect with data changes since it always consists of a 1 and 0.

Other message elements are used such as a message and word start pulses as follows:

Message and Word 1 Start Pulses=1111010101010011

Word Start Pulses (Word 2 and after)=11

Message End=0000 . . . (16 or longer)

In addition, each start pulse may be followed with no pulse zero conditions as follows:

Message and World 1 Start Pulses—followed by 4 periods of no pulses.

Word Start Pulses (Word 2 and after)—followed by 4 periods of no pulses

Dibit Data Words—followed by 4 periods of no pulses

The message eight start pulses serve to start the read of the following first word and message, and the eight end ON/OFF pulses may be used to synchronize the receive demodulation or read timing. Most significantly, the message and word fixed location pulses may be measured over the message in order to create an average receive Signal-Strength Indicator (SSI) value for determining signal integrity, create a rough approximation of distance or operate an AGC that operates over a single or multiple readings.

Figure 7:
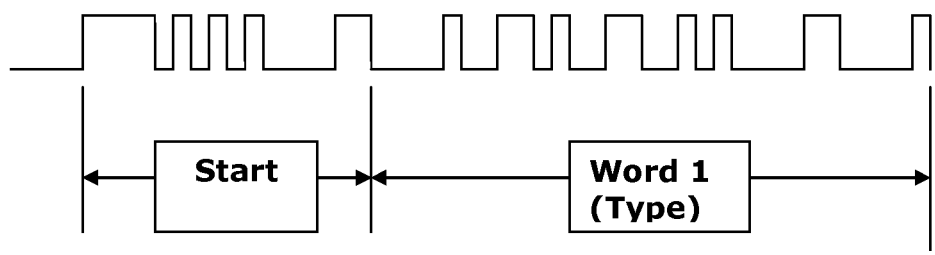
FIG. 7 includes an illustration of an exemplary signal transmission.

A partial transmission message is shown in FIG. 7. Message transmission format components may be provided based on the message elements and components above. However, various formats and methods may be envisaged. For example, the "Key" message is illustrated as 32 bits, but, depending on the type of encryption used, may be 100 bits or more. Further, the key message may be sent in multiple messages, or may be one of many keys for different purposes. In some cases, the information may be sent in two or more messages, separately. For example:

| Pulse Periods | Function | Description |
|---|---|---|
| 1 to 16 (16 bit or pulse spaces) | Start of Message Start of Word 1 (starts at end pulse off transition). Pulse may be modulated with 36 to 40 KHZ sub- | Eight consecutive ON (1) pulses that is a unique pattern that indicates Start of Message followed by six zeros (O1), followed by two pulse (11) whose end indicates the start of Word 1. |

-continued

| Pulse Periods | Function | Description |
|---|---|---|
| | carrier for use with common IR receivers. | For example followed by a minimum of 4 OFF pulse times. |
| 24 bits spaces | Message Word 1 (8 Data Dibits) Message Type (Define message number, format etc.) Allows multiple messages or a long message to be split into parts. Allows different message and word lengths. | Bits 5 to 8 are always Off (4) Bits 8 to 24 are data Dibits (8) Bits 25 to 29 are always OFF (4) A logic ONE dibit consist of a one bit ON (1) followed by a one bit Off (0). A logic ZERO dibit consist of a one bit OFF (o) followed by a one bit ON (1). Note in this and the following message a dibit may be impendent of other bits or encoded as a binary or other number, or a combination of both. |
| 2 Bit Spaces | Start of Word 2 (Starts at end transition) All Start pulses may be used for Signal Strength Indicator (SSI) measurements. | Two consecutive ON (1) pulses that are each 1 and are a unique pattern that indicates the start of a word. |
| 40 Bit Spaces | Word 2 Identification (16 bits) | Bits 1 to 4 are always OFF (4) Bits 5 to 37 are data Dibits (16) Bits 38 to 41 are always OFF (4) |
| 2 Bit Spaces | Start of Word 3 | Two consecutive ON (1) pulses that are each 1 and are a unique pattern that indicates the start of a word. |
| 40 Bit Spaces | Word 3 Location (16 bits) | Bits 1 to 4 are always OFF (4) Bits 5 to 37 are data Dibits (16) Bits 38 to 41 are always OFF (4) |
| 2 Bit Spaces | Start of Word 4 | Two consecutive ON (1) pulses that are each 1 and are a unique pattern that indicates the start of a word. |
| 40 Bit Spaces | Word 4 Address (16 bits) | Bits 1 to 4 are always OFF (4) Bits 5 to 37 are data Dibits (16) Bits 38 to 41 are always OFF (4) |
| 2 Bit Spaces | Start of Word 5 | Two consecutive ON (1) pulses that are each 1 and are a unique pattern that indicates the start of a word. |
| 40 Bit Spaces | Password (16 bits) | Bits 1 to 4 are always OFF (4) Bits 5 to 37 are data Dibits (16) Bits 38 to 41 are always OFF (4) |
| 2 Bit Spaces | Start of Word 6 | Two consecutive ON (1) pulses that are each 1 and are a unique pattern that indicates the start of a word. |
| 72 Bit Spaces | Key (32 bits) | Bits 1 to 4 are always OFF (4) Bits 5 to 69 are data Dibits (16) Bits 70 to 43 are always OFF (4) |
| 2 Bit Spaces | Start of Word 7 | Two consecutive ON (1) pulses that are each 1 and are a unique pattern that indicates the start of a word. |
| 16 Bit Space | Word 7 Security Status | Bits 1 to 4 are always OFF (4) Bits 5 to 21 are data Dibits (16) Bits 22 to 25 are always OFF (4) |
| 2 Bit Spaces | Start of Word 8 | Two consecutive ON (1) pulses that are each 1 and are a unique pattern that indicates the start of a word. |
| 16 Bit Space | Word 8 Alert or Alarm | Bits 1 to 4 are always OFF (4) Bits 5 to 21 are data Dibits (16) Bits 22 to 25 are always OFF (4) |
| 2 Bit Spaces | Start of Word 9 | Two consecutive ON (1) pulses that are each 1 and are a unique pattern that indicates the start of a word. |
| 16 Bit Space | Word 9 General Status | Bits 1 to 4 are always OFF (4) Bits 5 to 21 are data Dibits (16) Bits 22 to 25 are always OFF (4) |
| 2 Bit Spaces | Start of Word 10 | Two consecutive ON (1) pulses that are each 1 and are a unique pattern that indicates the start of a word. |
| 16 Bit Space | Word 10 Time and Data | Bits 1 to 4 are always OFF (4) Bits 5 to 21 are data Dibits (16) Bits 22 to 25 are always OFF (4) |
| 2 Bit Spaces | Start of Word 11 | Two consecutive ON (1) pulses that are each 1 and are a unique pattern that indicates the start of a word. |
| 16 Bit Space | Word 11 Controls | Bits 1 to 4 are always OFF (4) Bits 5 to 21 are data Dibits (16) Bits 22 to 25 are always OFF (4) |
| 2 Bit Spaces | Start of Word 11 | Two consecutive ON (1) pulses that are each 1 and are a unique pattern that indicates the start |

-continued

| Pulse Periods | Function | Description |
|---|---|---|
| | | of a word. |
| TBD | Word 11 Other | TBD |
| 16 Spaces or Greater | End of Message | All zeros 0000 . . . (16 or longer) |

The cryptographic receiving unit may perform numerous security functions within itself or in operation with an associated computer and software, such as enciphering or deciphering an encrypted file, data or other information, while in a specific location. For increased security, the cryptographic receiving unit may process encrypting functions within itself, some other accessory, or even by the control system.

Security functions may be initiated by the receiving unit on its self-contained instructions, or it may operate under the direction of a transmit unit, or under the direction of the control system. Example receiving unit security functions may include the following:

| Item | Function | Description |
|---|---|---|
| 1 | Encipher (Encrypting) | Converting a file, data or other information into an encrypted or secure file but within a specific location (equipped with a Cryptographic Transmit Unit or its virtual equivalent). |
| 2 | Decipher (Decrypting) | Converting a file, data or other information into an unencrypted or non-secure file (when in a within a specific authorized location). |
| 3 | Firewall (External or Internal Communication) | Prevents, restricts or enables external wired or wireless communication with the associated computer, system or components of the system. Activates and operates associated computer or system firewall software to provide this function. |
| 4 | Access Control (Operator) | Prevents, restricts or enables operator access to the associated computer or system. Requires a password, fingerprint reader, eye scanner, security badge or other methods to confirm identification and authority. May prevent, restrict or enable access to specific components of a computer or system such as disks, CDs, storage units, modems, printers etc. Operates with associated computer access control software to provide this function. |
| 5 | Shred (Files) | Converts a file or data to a form that cannot be read or recovered. Operates with internal firmware or activates associated computer or system shredding software to provide this function. |
| 6 | Analysis (Security) | Determines the security status of the associated computer or system. Operates with associated computer analysis software to provide this function. |
| 7 | Emergency Lockdown (Receiving unit, Computer or System) | Upon receiving alarm critical status or alert or alarm messages, it detects tamper, it is removed or it detects attempts to break into the system, the Receiving unit may: Disable or destroy its internal encryption keys and other critical information (even after being removed from the computer - using its own internal capacitor or battery power). Disable or stop computer and files access or destroy critical files immediately or at a specific time. After emergency lockdown the Receiving unit may be reset and reprogrammed by authorized personnel having correctly encrypted files and keys and passed security access requirements etc. |
| 8 | Transmit (Using addition Ports such as IR or Radio) | If the Receiving unit has transponder capability, it may communicate back to the Send Unit, if the Send Unit has transponder capability or to the Control System. Example, transmissions include: |

| Item | Function | Description |
|---|---|---|
| | | Message Reply Confirmation |
| | | Security Alert Or Alarms |
| | | Out Of Location (No Send Unit Reception) |
| | | Security Status Such As Tamper, Etc. |
| | | Setup or Programming Status |
| | | Associated Computer or System Status |
| | | Data Transfer (Authorized) |
| | | Message Transmission Requests |
| | | Re-transmission of Transmit Unit Inputs |
| | | Transmission as a Tag |
| | | Others |
| 9 | Storage | Store critical files within the Receiving unit that may be controlled and managed. |
| 10 | Other | The Receiving unit functions may be expanded to receive additional security or other message or provide other functions including: Setup Programming Reset Others |

In an exemplary configuration, the operation may be a one-way or open-loop location-specific access control. Security components may transmit encryption keys or codes, location, identification, enable, disable, status, alerts, alarms, controls, instructions and commands from a cryptographic transmit unit to a cryptographic receiving unit that operates to secure itself and an associated local computer, terminal, smart container or other items or system. The cryptographic transmit unit may be implemented as a wall unit that plugs into an AC wall power plug and transmits a coded signal, using wireless mediums such as infrared, light, acoustics, induction, radio or others, to a cryptographic receiving unit similar to a USB plug-in memory module, "memory stick", "flash memory" or "dongle".

Alternative embodiments use a computer, terminal or other system equipped with a wireless, acoustic, IR, optics, radio or other medium in connection with a USB port, keyboard port, mouse port, PCMCIA card, printer port, modem port, serial port, Ethernet port or other interface, port, or any combination thereof. The functions of a cryptographic receiving unit may be emulated using firmware and software.

In another embodiment, the system may use a wireless network, such as, 802.11, WiFi, Bluetooth, Wireless G, proprietary or other wireless modem or network to transmit cryptographic signals or "keys" and other information to a cryptographic receiver unit, as previously described, or the systems may use other common wireless or wired communication interfaces ports in the computer or system.

In an example, the system transmit signal may originate from a cryptographic unit or a control and monitoring system that in turn communicates the signal over a wireless or wired network. In this case, the cryptographic receiving unit that receives the signal may be implemented in the form of firmware or software in the computer or system, or may be contained in whole or in part within attached equipment, such as a USB memory unit. Another example includes an inexpensive USB Wireless G or a PCMCIA wireless interface, modem or other type of port for communication.

The transmit/transponder unit optionally may include an IR pickup to receive transmission of TV, VCR, CD and other remote control signals. In this manner, the transmit unit may inhibit for a limited time a transmission of a large signal that may prevent operation of these common device. Also, a similar capability or other wired or wireless method may be used to synchronize transmit units so that they do not overlap, or in order for them to provide multiple simultaneous sources for improved communications. In another example, several transmit units may send portions of each message, thereby using both units in order to operate.

The cryptographic transmit unit may include detection of tamper, motion, movement, proximity, capacitance, power loss, or other methods to prevent unauthorized use if the cryptographic transmit unit is interfered with or removed. One or more detected conditions may cause the unit to transmit alert and alarm signals and may cause the immediate destruction of internal encryption codes and keys, locked files, or other records.

When a periodic transmit signal is not received by the cryptographic receiving unit, or when a signal is received that indicates an attempt to remove or defeat the systems operation, the cryptographic receiving unit may prevent access to files, data or hardware, or, in some cases, may be programmed to destroy specific files or otherwise inhibit access, storage or communication in an associated computer, terminal or system.

In a particular embodiment, the cryptographic receiving unit may not have sufficient internal information to enable access without continuous communication of keys, codes, controls and other data from a specific cryptographic transmit unit. For example, the cryptographic receiving unit and the cryptographic transmit unit may work together as a binary, where both parts are used, and in an expanded configurations additional communications and systems access may be used to permit operation.

For enhanced security, two or more transmit or transponder units may be used in the same room or area, but located apart. Each transmit unit may transmit a code, or a portion of a code, and the receiving unit receives both to operate. Alternatively, the receiving unit may operate using either signal input, wherein signal and location source redundancy adds to the integrity of the system in insuring reception of a signal.

Multiple transmit units may transmit with random variation in timing to reduce signal collisions, or they may have a communication link between units to provide synchronization of their outputs. A timing relationship or synchronization between the multiple received signals by the receiving unit also may be used to increase the security of the system.

In addition, other signal relationships such as rolling codes may be operated together, wherein the signals may be confirmed to be correlated with each other when received. For example, one transmit unit may transmit the converse of the other, or have some other static or continuously changing relationship, or otherwise be correlated. Any variation in the defined protocol of operation may be detected and may result an alert or alarm condition.

In another exemplary embodiment, the system includes two-way or closed-loop components, which operate with two-way communication between a cryptographic transmit/transponder unit and a cryptographic receive/transponder unit that is connected to an associated computer, terminal, smart container or other unit or system. In this embodiment, the functions provided in the one-way system above may be included in addition to communication from the cryptographic receive/transponder unit back to the cryptographic transmit/transponder unit. In an example, attempts to tamper, move, or otherwise remove or access files or equipment connected to the receiving unit in an improper fashion may be communicated to the cryptographic transmit unit, resulting in an alert or alarm condition and deactivation of its operation.

Keys, codes, and other data sent from the cryptographic transmit/transponder unit to the cryptographic receive/transponder may result in a confirmation response to indicate reception of the message, as well as, the unit status and other information. The absence of a response may result, in an alert or alarm condition, and with a deactivation of the unit and system operation.

Alternatively, a wireless network or modem may be used to transmit a key to a computer or system. With bi-directional capability, a closed-loop system may be achieved. Such closed-loop capabilities further may contribute to detecting and recording authorized and preventing unauthorized attempts to tamper, move, access, or remove equipment, files or data.

Another exemplary embodiment includes a system which has one or two-way communication between a cryptographic transponder or transmit unit, that also has wired, Ethernet, signal over power lines, carrier current or wireless, such as radio, one or two-way system communication capability with a receive/transceiver units and associated local, remote or central control or monitoring system. The signal may be implemented through a SRD (short-range devices) or RFID tag standard or proprietary type communication format or WiFi, Bluetooth, ISM, GSM, CEMA, telephony, spread spectrum, FWA (Fixed Wireless Access), or in accordance with other wireless standards.

In addition to the functions defined above, such an embodiment provides additional control and monitoring of the system. For example, the status of the cryptographic transmit/transponder unit may be monitor to confirm its status, and if the cryptographic transmit unit is removed, or if an alert or alarm condition is noted, the system may broadcast the alarm to personnel and cause appropriate security procedures to be implemented. If two-way capability is provided the control and monitoring system may send keys, controls, instructions, control, commands, time and date and other inputs for control or use by the cryptographic transmit unit or the cryptographic receiving unit.

A further embodiment includes a system that operates with one or two-way communication between a transmit/transponder unit and a receiving unit. The receiving unit may be connected to an associated computer or system, and also may have a wireless transmit capability to a remote receive/reader and control or monitoring system. In operation with a transmit/transponder unit also having communication capability to the control or monitoring system, an overall closed-loop system is provided. Where two-way communication is provided between the transmit/transponder unit and the control or monitoring system and the transmit/transponder unit and receive/transponder unit, dual-path communication redundancy is provided for additional security.

In such an embodiment, messages, starting from either the transmit/transponder unit or the receive/transponder unit may travel in both paths. Attempts to move equipment, block communication, the interdiction of false or reproduced keys, codes or data, or other actions may be detected and monitored at the system level. In addition, the control or monitoring system may send enabling, disabling, access control, randomize and provide other static or dynamic controls and capabilities to each component in the system.

A further exemplary embodiment includes a system in which, in addition to the above capabilities, transmit/transponder or a receive/transponder units, or other devices, may communicate and operate with a central control, monitor and location system. The devices may interface, communicate and operate, using the Internet, WI-FI (Wireless Fidelity), Ethernet, Bluetooth, 802.11, carrier current, Wireless G, spread spectrum, cellular telephone networks, telephone lines, cables, wires, infrared, acoustics, radio or other methods, or any combination thereof, and operates locally, globally or both.

If such communication capability is added to the configurations above, such as between a cryptographic receiving or transponder unit connected with a computer, smart container, or other system, an added level of security may be achieved. Communications between the cryptographic transmit or transponder unit may be monitored by a local, remote or global control or monitoring system. Appropriate firewalls, controlled access, communication controls, encryption and other security measures may be implemented to secure the communication or block unauthorized communication.

In such a configuration, keys, controls, status, commands and other inputs from cryptic transmit or transponder units may be monitored and confirmed. Received alarm or alert transmissions and attempts to remove equipment or access files may be detected and acted upon. If used with a transmit transponder, dual or redundant communication exists between the computer and the control or monitoring system. If the cryptic receiving or transponder unit also has communication capability, a third level of communication is provided.

Multiple communication paths provide additional confirmation of information to insure that it matches or corresponds. In particular, each component, the transmit unit, the receiving unit, and the control and monitoring system may independently communicate with each of the other components to confirm status and provide data, such as data keys. With further use of robust communication rates, tamper, motion, proximity and other sensors, or simply the absence or a periodic transmission, long interrogation periods, chip sequences or errors in the data may indicate an alert or alarm condition.

The system also may provide inputs and outputs in operation with local and remote security sensors, environmental sensors, proximate detectors, key locks, alarms, door access units, indicators, displays, lights and other devices and systems. In an example, one or more of the components may communicate and operate with a portable terminals, PDAs or computers, using IR, radio, or combination thereof, in operation with cryptographic unit's signpost, USB module, computer, system, receiver or a system controller.

In addition, the transmit units, receiving units, or associated control and monitoring system also may have GPS capability, in order to be able to locate equipment or files to a certain geographic area. A GPS system may provide the communication of data keys or other security information to certain areas or to specific equipment equipped with a capable receiving unit. This might be useful in large strategy military or disaster relief operations.

The system also may operate with RFID tags on a computer or other system equipment that may receive signpost signal inputs, receive inputs from sensors, such as motion sensors, tamper controls, and other inputs, or provide outputs to controls, indicators, and other devices, and transmit signals to receivers. For example, the system may determine a cryptographic graphic unit or tag location to within a proximity area or zone, or to within a segment or portion of the proximity area.

The system may receive, encode, store, process and transmit encrypted data or other coded information, and may provide data and control inputs and outputs to provide security for the system, and other objects, persons or vehicles. In addition, the system may operate independently or globally as part of an overall security, asset or supply-chain control and management system, operating in accordance with UCC, EPCglobal, ISO, IEC, WI-FI, 802.11 or other standards, or with overall system control on a website.

In a particular embodiment, real-time communication, locating, tracking and monitoring systems employ transmit only, receive only, transceiver or transponder tags or devices that are small and inexpensive, and which may be attached to or placed in objects, persons, vehicles, and other items. Multiple combinations of configurations may be envisaged, involving tags, cryptographic units, wireless networks, or other system components, or any combination thereof.

With respect to security, attempts may be made to thwart the protections provided by the devices, such as attempts to remove or overcome the transmit or receiving unit security functions. As such, particular embodiments are disclosed below that provide further security to the system.

For example, the transmit unit may be plugged into AC power and if removed or tampered with, may send an alert or alarm message to the receiving unit, as well provide as a light or acoustic alarm. The transmit unit may employ a motion sensor, movement sensor, proximity detector, switch, capacitance detector, heat sensor, IR reflection detector, or any combination thereof to detect any attempt to circumvent its operation.

The transmit unit also may inhibit its own operation, or, destroy its internal operation keys, codes or other files, or after a preprogrammed amount of time, destroy its keys, codes, or files. In this manner, even if the transmit unit is stolen, the transmit unit may not be used in the same or another location, as the encryption keys and codes do not exist within the unit. If connected to a control and monitoring system, rolling codes, interrogation, chip sequences, combined with random codes may also be used to limit emulation of the system operation.

In another example, the receiving unit may instruct associated computer system software to allow, not allow, or allow only in certain conditions, or at certain times, or for a period of time such as 8 hours during working hours, computer access, operation or access to critical files. The receiving unit may enable or disable the download of critical files to a memory unit, CD, disk, printer, communication port, and other mediums, or may encrypt data. In a further example, the receiving unit may destroy files, or program them to be destroyed after a period of time, such as in 30 days if not accessed in an authorized fashion, such as using a receiving unit on a computer equipped with appropriate software in the location of a transmit unit In addition, the receiving unit may allow non-critical or the operator's personal files to be accessed and otherwise used without security protocol.

In a further exemplary embodiment, two or more transmit or transponder units may transmit codes or portions of codes and the receiving unit may use both to operate, otherwise an alert or alarm condition may be raised. The signals may be synchronized so that they are received with specific timing and other relationships.

Conversely, the receive/transponder unit, such as in a USB memory unit connected to the computer, smart container or other unit or system may detect motion, movement, removal, or attempts to overcome its operation, or to access, remove, communicate, or otherwise perform unauthorized operations. If these actions or attempts are detected, the system access may be denied, files may be hidden, communication may be prevented, or critical files may be block, left encrypted, or destroyed.

If the receiving unit or associated computer has a transponder, wireless transmitter, or system network, cable or other capability, an alert or alarm condition may be transmitted to other transponders as well as to a control or monitoring system. As such one, two, three, or more paths may be implemented. In particular embodiments, the transmissions may have rolling or continually changing codes. In this method codes or portions of codes may change in each successive transmission. For example, codes may change without repetition over many years. Alarms or alerts may be generated if each of the communications are not received without differences or incompatible or missing inputs in the received communication at the control or monitoring system level.

If an alert or definitive alarm condition is detected, in an expanded system, acoustic alarms may be activated, doors may be automatically locked, warning messages may be sent to local and remote personnel, critical equipment operation may be disabled, files encryption locked, unauthorized communication may be inhibited, and people may be stopped and searched.

Embodiments of such systems may be used for immediate detection and action in a specific location to prevent equipment and file theft, or to control local access. In an additional embodiment, such a system may be part of a comprehensive control and monitoring system that includes monitor tags, badges and other devices within an extended area. If equipment or data is removed from a specific location, for example, from a room, secondary security actions may be implemented. The doors of a room or facility may be blocked by personnel or automatic access control methods may prevent entrance or exit.

In addition, in an expanded system, other secondary security functions may be implemented to further increase securing of equipment, files and personnel. For example, to maintain data security, when a person enters a security room without an appropriate electronic badge, or badge having sufficient authorization level, or as they walk past a computer, the computer screen may be darkened or turned off or access to the computer denied. Also, the system may record the history of users, file access, file copy, rapid download, or changes in use or operation.

An exemplary badge may be equipped with a wireless IR, acoustic, radio, wireless network, or other cryptographic transmit or transponder unit or other receiving unit capability, or may receive signals from other types of location determining transmitter or transponder units. Further, the badge may send wireless radio or other signals to a remote receiver that is part of a control or monitoring system. In this manner, the location of an individual in the facility, area or a specific room may be determined. Their access may therefore be controlled by access controlled doors.

In a further exemplary embodiment, smart containers may be big shipping containers used to transport goods around the world, or may be small portable container or safe type of units used to carry and secure critical items, such as data storage tape, such as from a bank. An electronic cryptographic transmit or transponder unit may be used to secure a container with a receiving unit. When the container or unit is transported, it may only be accessed or opened in authorized places.

In some case the transmit unit in secure areas may be inactive except during specific conditions, such as in an authorized location, during working hours, during the workweek or other predetermined conditions. Uniquely, a key also may be inactive until an enable signal is transmitted to it by a control or monitoring system. In this manner, the system may centrally control the location and the environment, or may authorized operation for a specific customer or item.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of securing data, the method comprising:
   receiving a signal at a portable receiver unit and from a fixed location transmitter remote from the portable receiver unit, the fixed location transmitter including a sensor to detect tampering with the fixed location transmitter or to detect movement of the fixed location transmitter, the signal including a data key and a tamper status indicator;
   formulating an encryption key based at least in part on the data key when the tamper status indicator does not indicate activation, the data key forming at least a part of the encryption key; and
   decrypting encrypted data using the encryption key at the portable receiver unit.

2. The method of claim 1, further comprising receiving an input at the portable receiver unit, the method further comprising determining the encryption key based at least in part on the data key and at least in part on the input.

3. The method of claim 2, wherein the input is a password.

4. The method of claim 2, wherein the input is a receiving unit identifier.

5. The method of claim 2, wherein the input is a device identifier.

6. The method of claim 1, further comprising receiving at the portable receiver unit a second signal from a second fixed location transmitter remote from the portable receiver unit, the second signal including a second data key.

7. The method of claim 6, wherein determining the encryption key includes determining the encryption key based at least in part on the data key and the second data key.

8. The method of claim 1, wherein determining the encryption key includes determining the encryption key using the portable receiving unit, the method further comprising providing the encryption key to a device coupled to the portable receiving unit.

9. The method of claim 1, wherein decrypting the encrypted data includes decrypting data stored on the portable receiving unit.

10. The method of claim 1, further comprising transmitting a confirmation signal to the fixed location transmitter.

11. The method of claim 1, further comprising denying access to the encrypted data based at least in part on an absence of the signal.

12. The method of claim 1, wherein the signal is a wireless signal.

13. The method of claim 1, wherein receiving occurs remote from the fixed location transmitter.

14. An apparatus comprising:
   a receiver to receive a signal from a fixed location transmitter remote from the receiver, the signal including a data key and a tamper status indicator, the tamper status indicator generated by a sensor of the fixed location transmitter, the sensor to detect tampering with the fixed location transmitter or to detect movement of the fixed location transmitter; and
   a computational circuitry coupled to the receiver, the computational circuitry to permit access to data based at least in part on the data key and the tamper status indicator, wherein the data key forms at least part of an encryption key and wherein the computational circuitry is to decrypt the data using the encryption key when the tamper status indicator does not indicate tampering with the fixed location transmitter.

15. The apparatus of claim 14, wherein the computational circuitry is to deny access in the absence of the signal.

16. The apparatus of claim 14, further comprising an interface to a computational device.

17. The apparatus of claim 16, wherein the interface comprises a universal serial bus (USB) interface.

18. The apparatus of claim 14, wherein the receiver includes an infrared receiver.

19. The apparatus of claim 14, further comprising a radio frequency (RF) transponder.

20. The apparatus of claim 14, wherein the signal is a wireless signal.

21. A system comprising:
   a fixed location transmit unit to transmit a signal including a data key and a tamper status indicator, the transmit unit including a tamper sensor to detect tampering with the fixed location transmit unit or movement of the fixed location transmit unit, the transmit unit to change the tamper status indicator to active in response to the tamper sensor; and
   a portable receiving unit remote and separate from the fixed transmit unit to receive the signal, the receiving unit to determine an encryption key based at least in part on the data key and to decrypt encrypted data using the encryption key when the tamper status indicator is not active, the data key forming at least a part of the encryption key.

22. The system of claim 21, further comprising a device coupled to the receiving unit, the device to store the encrypted data and to receive the encryption key from the receiving unit.

23. The system of claim 21, wherein the encrypted data is stored on the receiving unit.

24. The system of claim 21, wherein the receiving unit includes a universal serial bus (USB) interface.

25. The system of claim 21, wherein the receiving unit includes an IR receiver.

26. The system of claim 21, wherein the receiving unit includes an RF transponder.

27. The system of claim 21, further comprising a control and monitoring system in communication with the transmit unit.

28. The system of claim 27, wherein the control and monitoring system provides the data key to the transmit unit.

29. The system of claim 21, further comprising a central monitor in communication with the receiving unit, the receiving unit to transmit a second signal including an indicator associated with the tamper status indicator.

30. The system of claim 21, wherein the signal is a wireless signal.

* * * * *